United States Patent

Kishi et al.

Patent Number: 5,982,458
Date of Patent: Nov. 9, 1999

[54] CONVERGENCE CORRECTION CIRCUIT AND THREE TUBE TYPE PROJECTOR HAVING THE SAME

[75] Inventors: Narufumi Kishi, Kanagawa; Masayuki Omori, Tokyo, both of Japan

[73] Assignee: Sony Corporation, Tokyo, Japan

[21] Appl. No.: 08/675,000

[22] Filed: Jul. 3, 1996

[30] Foreign Application Priority Data

Jul. 7, 1995 [JP] Japan .................................. 7-172169

[51] Int. Cl.⁶ .............................. H04N 3/22; H04N 9/28; H01J 29/70; G09G 1/28
[52] U.S. Cl. .................... 348/745; 313/428; 315/368.19; 315/368.26; 348/807
[58] Field of Search ...................... 348/744, 745, 348/625, 730, 806, 807, 177, 178, 180, 184, 189, 190; 315/5.34, 8, 8.61, 5.35, 9, 258, 262, 264, 283, 289, 368.11, 368.28, 368.27; 313/427, 428, 430, 431; H04N 3/22; G09G 1/28

[56] References Cited

U.S. PATENT DOCUMENTS

| | | | |
|---|---|---|---|
| 3,894,267 | 7/1975 | Matsumoto et al. ..................... | 315/368 |
| 4,833,370 | 5/1989 | Sakurai et al. .......................... | 315/368 |
| 4,961,030 | 10/1990 | Ogino ...................................... | 315/368 |
| 5,070,280 | 12/1991 | Okuyama et al. ................. | 315/368.11 |

FOREIGN PATENT DOCUMENTS

| | | | |
|---|---|---|---|
| 9517763 | 6/1995 | WIPO ............................. | H01J 29/56 |
| WO 95/17763 | 6/1995 | WIPO ............................. | H01J 29/56 |

*Primary Examiner*—John W. Miller
*Attorney, Agent, or Firm*—Jay H. Maioli

[57] ABSTRACT

A convergence correction circuit for use in a projection CRT of the electrostatic focusing type, including a neck portion provided with a sub-deflection yoke for convergence correction. A coupling correction filter and an eddy current correction filter are interposed between a path of a convergence correction signal. The coupling correction filter corrects a change in correction frequency characteristic due to an influence of coupling of a sub-deflection yoke and a deflection yoke, and the eddy current correction filter corrects a change in correction frequency characteristic due to an influence of an eddy current caused in an electrostatic convergence electrode by a magnetic field generated in the sub-deflection yoke. When a coil of the sub-deflection yoke is supplied with a current proportional to an output of the correction filter, convergence correction is performed. There is obtained correction frequency characteristic which is flat, so that a motion of an image on a fluorescent screen of the cathode-ray tube coincides with a wave form of a correction signal. Therefore, high-precision convergence correction can be obtained.

2 Claims, 8 Drawing Sheets

FIG. 8A Scp

ONE HORIZONTAL PERIOD

FIG. 8B So

FIG. 8C icp

CONVERGENCE CORRECTION CIRCUIT AND THREE TUBE TYPE PROJECTOR HAVING THE SAME

BACKGROUND OF THE INVENTION

1. Field of the Invention

The present invention relates to a convergence correction circuit and a three tube type projector including the convergence correction circuit. More particularly, the present invention relates to a convergence correction circuit which can perform high-precision convergence correction by interposing a correction filter for correcting a change in the correction frequency characteristic caused by an influence of coupling of a sub-deflecting yoke with a deflecting yoke, between a path of a correction signal supplied to the sub-deflecting yoke for convergence correction, and to a three tube type projector including the convergence correction circuit.

2. Description of the Related Art

Figure 1:
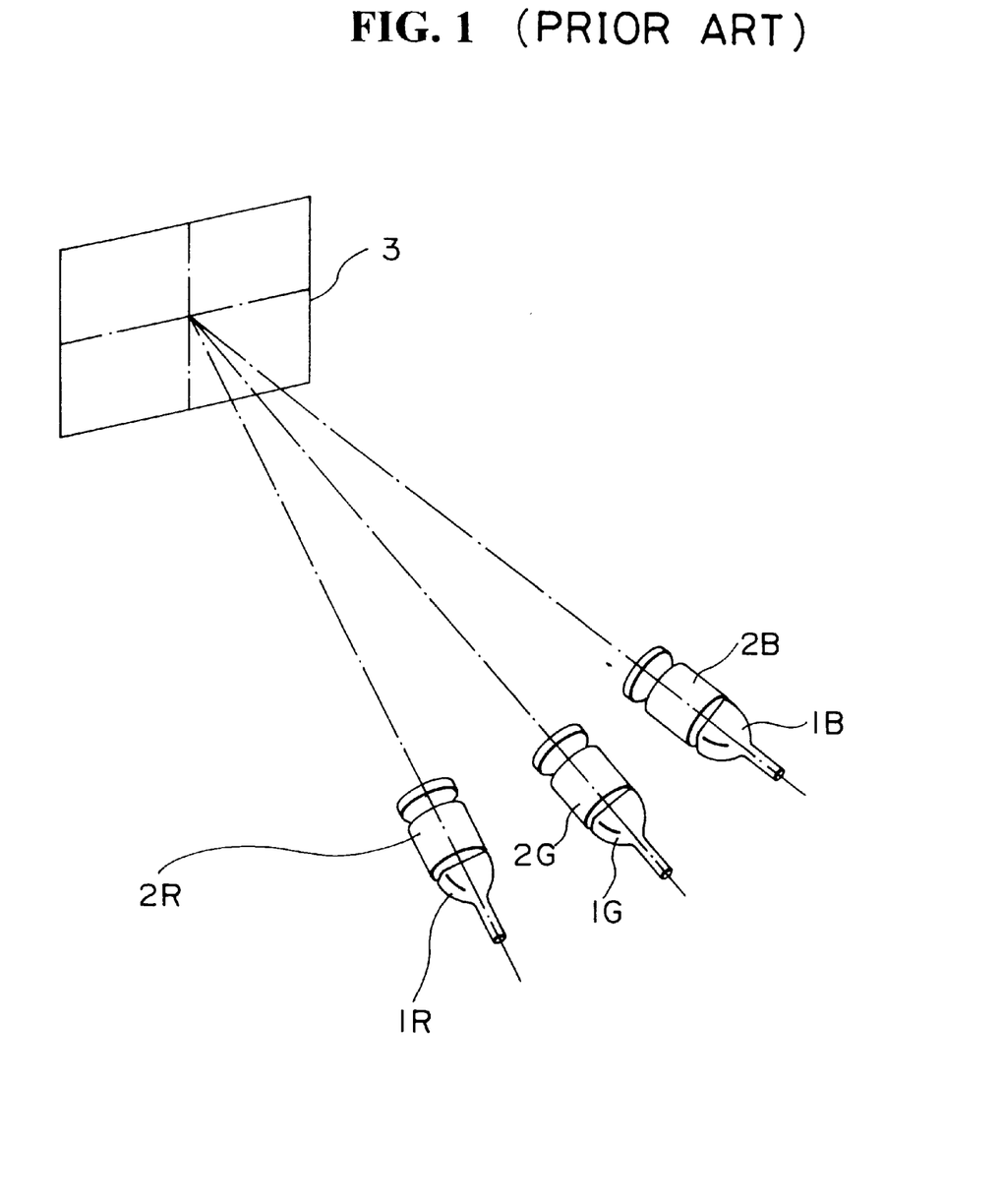
FIG. 1 is a view for explaining an outline of the three-tube type projector.

Conventionally, there has been known a three tube type projector including projection cathode-ray tubes (projection CRT) for red, green and blue color images. As shown in FIG. 1, the tree tube type projector is constructed so that respective color images displayed on each fluorescent screen of projection cathode-ray tubes 1R, 1G and 1B for red, green and blue color images are individually projected on a screen 3 through respective projection lenses 2R, 2G and 2B, and an enlarged color image is produced on the screen 3.

In order to converge red, green and blue color images on the screen 3, a convergence correction circuit is used. More specifically, a neck portion of respective cathode-ray tubes 1R, 1G and 1B is provided with a sub-deflection yoke for convergence correction separately from the deflection yoke, and a correction signal is supplied to the sub-deflection yoke to perform convergence correction, thus red, green and blue color images are converged on the screen 3.

Figure 2:
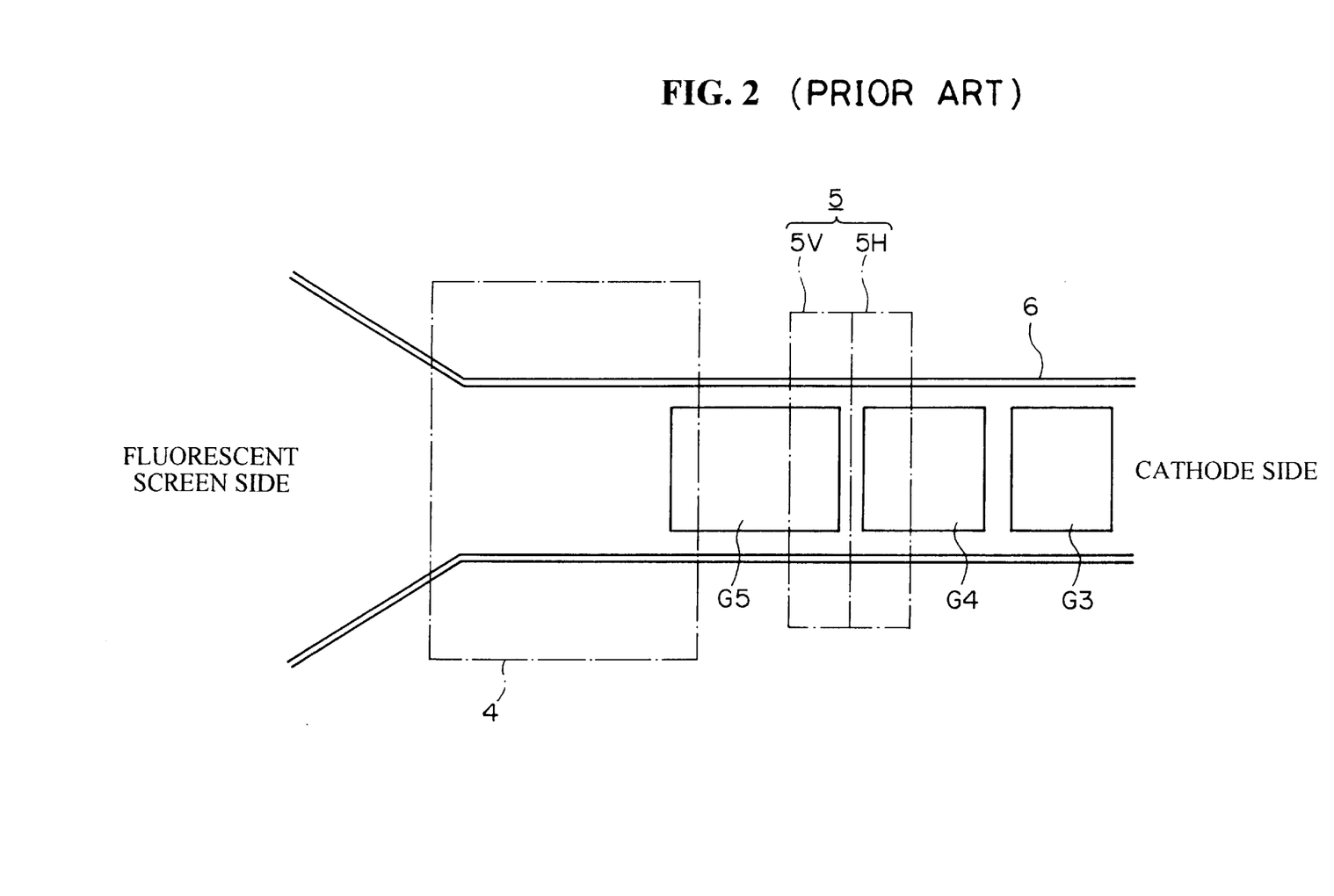
FIG. 2 is a view showing an arrangement relationship between a deflection yoke, a sub-deflection yoke and an electrostatic focusing electrode in an electrostatic focusing cathode-ray tube.

FIG. 2 shows a positional relationship between a main deflection yoke and a sub-deflection yoke in an electrostatic focusing (unipotential gun type) cathode-ray tube. A focusing electron lens is composed of a third grid electrode G3 functioning as an acceleration electrode, a fourth grid electrode G4 functioning as a focusing electrode and a fifth grid electrode G5 functioning as an acceleration electrode. The sub-deflection yoke 5 (horizontal sub-deflection yoke 5H, vertical sub-deflection yoke 5V) is arranged in a neck portion 6 of the cathode-ray tube and situated on the cathode side closer than the deflection yoke 4. For instance, the sub-deflection yoke 5 is arranged oppositely to the fourth and fifth grid electrodes G4 and G5.

Figure 3:
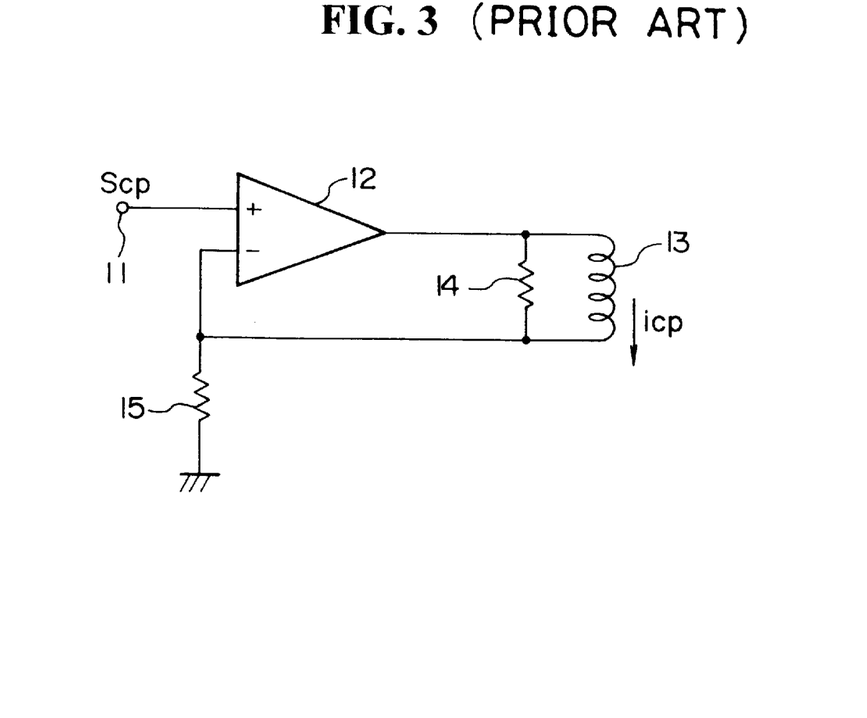
FIG. 3 is a view showing a configuration of a conventional convergence correction circuit.

FIG. 3 shows a configuration of a convergence correction circuit (sub-deflection output circuit) for supplying a correction current to a coil constituting a horizontal deflection yoke 5H or vertical deflection yoke 5V. As shown in FIG. 3, an input terminal 11 is led from a noninverting input terminal of an operational amplifier 12, and a convergence correction signal Scp is supplied to the input terminal 11. On the other hand, an output terminal of the operational amplifier 12 is connected to an inverting input terminal of the operational amplifier 12 through a parallel circuit which consists of a coil 13 constituting a sub-deflection yoke and a resistor 14. Also, the inverting input terminal of the operational amplifier 12 is grounded through a resistor 15. In the convergence correction circuit having a configuration as described above, when the convergence correction signal Scp is supplied to the input terminal 11, the coil 13 constituting a sub-deflection yoke is supplied with a current icp proportional to the correction signal Scp, and thus, convergence correction is performed.

Figure 4A:
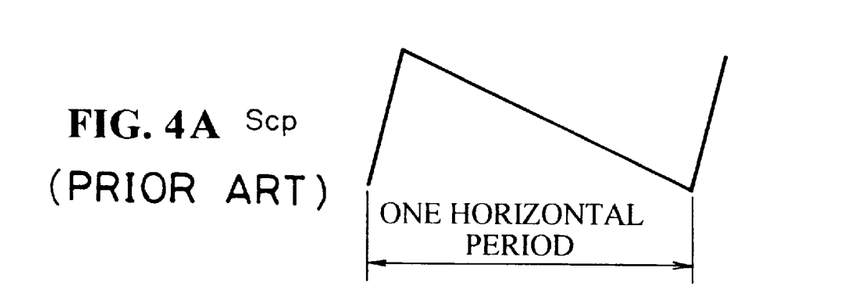
FIG. 4A and 4B show a relationship between a wave form of a correction signal and motion of an image on a fluorescent screen of a cathode-ray tube according to a conventional example.
Figure 4B:
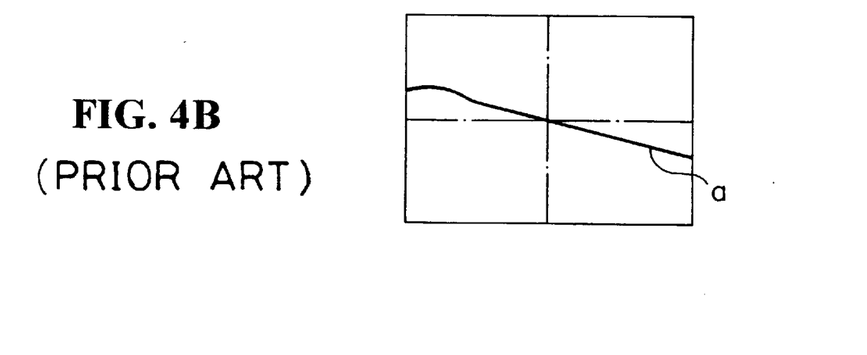

In the case where the convergence correction circuit as shown in FIG. 3 supplies a current icp proportional to a correction signal Scp to the coil 13 constituting a sub-deflection yoke to carry out convergence correction, the motion of image on a screen does not coincide with a wave form of the correction signal Scp in the convergence correction; for this reason, there has arisen a problem in that high-precise convergence correction does not come true. For instance, when the correction signal Scp as shown in FIG. 4A is supplied to the input terminal 11 of the convergence circuit for a vertical sub-deflection yoke 5V, the motion of image on a screen is as indicated by a solid line "a" shown in FIG. 4B, and does not coincide with a wave form of the correction signal Scp.

OBJECT AND SUMMARY OF THE INVENTION

The present invention has been made in view of such circumstances. An object of the present invention is to provide high-precise convergence correction.

To achieve the above object, the present invention provides a convergence correction circuit which corrects convergence by supplying a correction signal to a sub-deflection yoke arranged in a neck portion of a projection cathode-ray tube separately from a deflection yoke, the convergence correction circuit including a coupling correction filter which corrects a change in correction frequency characteristic due to an influence of coupling of the sub-deflection yoke with the deflection yoke, and the coupling correction filter is provided in the path of the correction signal. In the case where the projection cathode-ray tube has an electrostatic convergence electrode, the convergence correction circuit includes an eddy current correction filter which corrects a change in correction frequency characteristic due to an eddy current caused in the electrostatic focusing electrode due to a magnetic field generated by the sub-deflection yoke, and is connected in series with the coupling correction filter.

Moreover, the present invention provides a three tube type projector which has projection cathode-ray tubes for red, green and blue color images, wherein convergence is corrected by supplying a correction signal to a sub-deflection yoke arranged in a neck portion of a projection cathode-ray tube separately from a deflection yoke, the three tube projector comprising a coupling correction filter which corrects a change in correction frequency characteristic due to an influence of coupling of the sub-deflection yoke with the deflection yoke, and the coupling correction filter is provided in the path of the correction signal. In the case where the projection cathode-ray tube has an electrostatic focusing electrode, the three tube type projector includes an eddy current correction filter which corrects a change in correction frequency characteristic due to an eddy current caused in the electrostatic focusing electrode by a magnetic field generated by the sub-deflection yoke, and is connected in series with the coupling correction filter.

When a correction signal is supplied to a sub-deflection yoke for convergence correction, which is arranged in a neck portion of a projection cathode-ray tube separately from a deflection yoke, convergence correction is executed. A coupling correction filter is interposed between a path of the correction signal in order to correct a change in correction frequency characteristic due to an influence of coupling of the sub-deflection yoke with the deflection yoke. Thus, a change in correction frequency characteristic due to an influence of coupling of the sub-deflection yoke with the deflection yoke can be corrected. Also, in the case where the projection cathode-ray tube has an electrostatic focusing electrode, an eddy current correction filter is connected in series with the coupling correction filter in order to correct a change in correction frequency characteristic due to an eddy current caused in the electrostatic focusing electrode due to a magnetic field generated by the sub-deflection yoke. Thus, a change in correction frequency characteristic clue to an eddy current caused in the electrostatic focusing electrode due to a magnetic field generated by the sub-deflection yoke can be corrected. Whereby the motion of the image on a screen coincides with a wave form of a convergence correction signal during convergence correction.

Additional objects and advantages of the present invention will be apparent from the following detailed description of a preferred embodiment thereof, which is best understood with reference to the accompanying drawings.

DESCRIPTION OF THE PREFERRED EMBODIMENT

Figure 5:
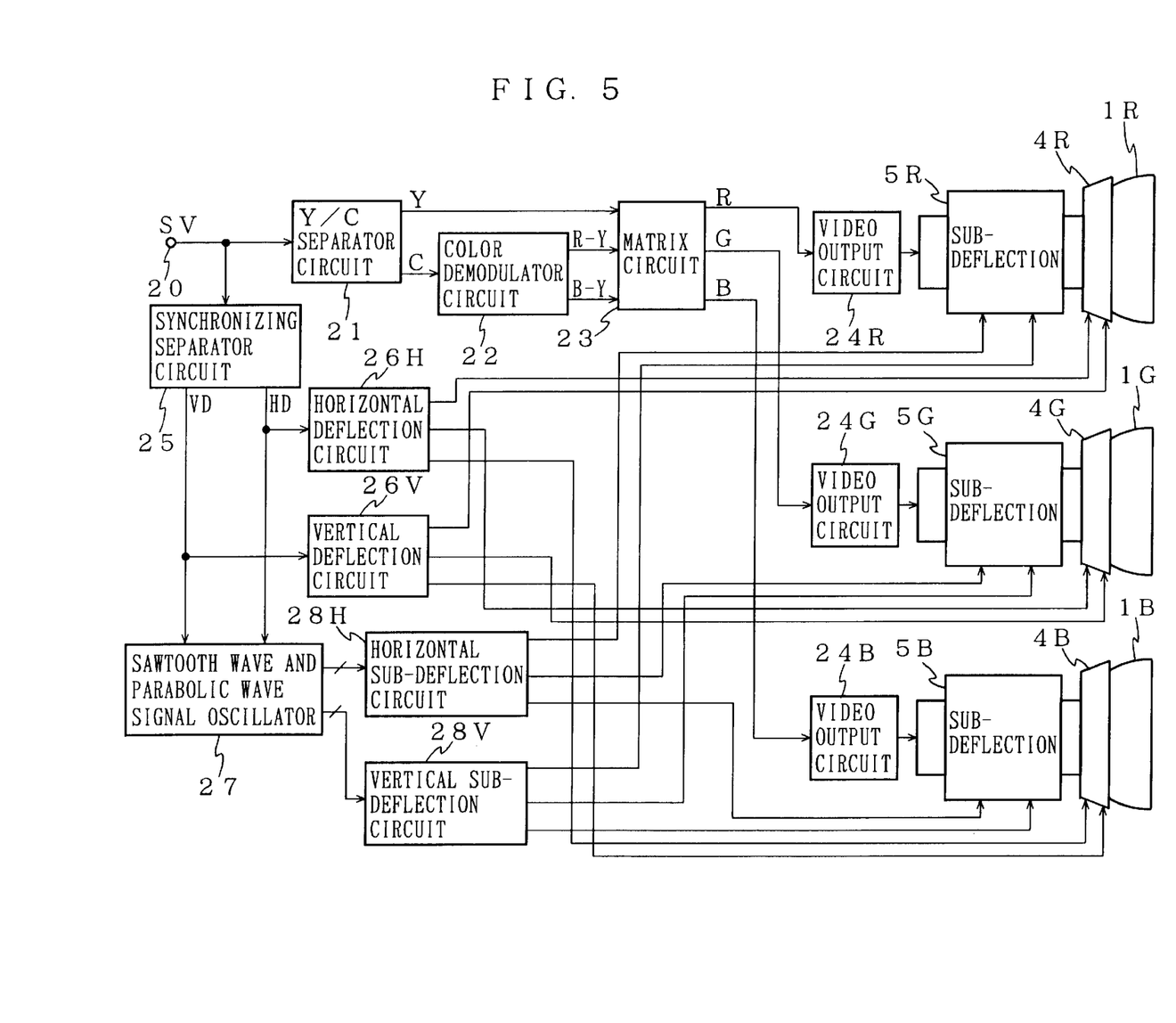
FIG. 5 is a view showing a circuit configuration of a three tube type projector according to an embodiment of the present invention.

An embodiment of the present invention will be described below in detail with reference to the accompanied drawings. FIG. 5 shows a circuit configuration of a three tube type projector according to an embodiment of the present invention.

The three tube type projector shown in FIG. 5 includes projection cathode-ray tubes (projection CRT) 1R, 1G and 1B for red, green and blue color images. The cathode-ray tubes 1R, 1G and 1B are individually of the electrostatic focusing type (unipotential gun type). These cathode-ray tubes 1R, 1G and 1B are provided with deflection yokes 4R, 4G and 4B, and sub-deflection yokes (horizontal, vertical sub-deflection yokes) 5R, 5 and 5B for convergence correction, arranged separately from deflection yokes 4R, 4G and 4B, respectively. These sub-deflection yokes 5R, 5G and 5B are individually provided in a neck portion of respective cathode-ray tubes 1R, 1G and 1B, and arranged on the cathode side closer than deflection yokes 4R, 4G and 4B. Further, these sub-deflection yokes 5R, 5G and 5B are individually arranged at a position opposing a fourth grid electrode G4 and a fifth grid electrode G5, for example (see position of sub-deflection yoke 5 in FIG. 2).

The foregoing three tube type projector shown in FIG. 5 includes a Y/C separation circuit 21 for separating a video signal SV into a luminance signal Y and a carrier chrominance signal C, a color signal demodulator circuit 22 for demodulating the carrier chrominance signal C to obtain a red color difference signal R-Y and a blue color difference signal B-Y, a matrix circuit 23 for obtaining red, green and blue color signals R, G and B from the luminance signal Y and color difference signals R-Y and B-Y, and video output circuits 24R, 24G and 24B for amplifying color signals R, G and B and for driving cathode-ray tubes 1R, 1G and 1B.

When the video signal SV is supplied to the Y/C separation circuit 21 from an input terminal 20, the video signal SV is separated into a luminance signal Y and a carrier chrominance signal C by using a comb filter, etc. The color signal demodulator 22 is supplied with the carrier chrominance signal separated by the Y/C separation circuit 22, and then, the carrier chrominance signal is demodulated by R-Y and B-Y axes of the demodulator to obtain color difference signals R-Y and B-Y. The matrix circuit 23 is supplied with the luminance signal Y separated by the Y/C separation circuit 21 and color difference signals R-Y and B-Y outputted from the color signal demodulator 22, and then, these luminance and color difference signals are subjected to a matrix processing to obtain color signals R, G and B. Video output circuits 24R, 24G and 24B are individually supplied with color signals R, G and B obtained by the matrix circuit 23, and then, color signals R, G and B amplified by video output circuits 24R, 24G and 24B are supplied to a cathode K of respective cathode-ray tubes 1R, 1G and 1B.

Further, the three tube type projector shown in FIG. 5 includes a synchronizing separator circuit 25 for separating the video signal SV into a horizontal synchronizing signal HD and a vertical synchronizing signal VD, a horizontal deflection circuit 26H for supplying a sawtooth wave current for horizontal deflection to a horizontal deflection coil constituting each of deflection yokes 4R, 4G and 4B of cathode-ray tubes 1R, 1G and 1B, and a vertical deflection circuit 26V for supplying a sawtooth wave current for vertical deflection to a vertical deflection coil constituting each of deflection yokes 4R, 4G and 4B thereof.

The synchronizing separator circuit 25 is supplied with a video signal SV from the input terminal 20, and then, the video signal SV is separated into horizontal and vertical synchronizing signals HD and VD. When the horizontal deflection circuit 26H is supplied with a horizontal synchronizing signal HD separated by the synchronizing separator circuit 25, the horizontal deflection circuit 26H is operated so as to supply a sawtooth current to a horizontal deflection coil constituting each of deflection yokes 4R, 4G and 4B synchronously with the horizontal synchronizing signal HD. On the other hand, when the vertical deflection circuit 26V is supplied with a vertical synchronizing signal VD separated by the synchronizing separator circuit 25, the vertical deflection circuit 26V is operated so as to supply a sawtooth wave current to a vertical deflection coil constituting each of deflection yokes 4R, 4G and 4B synchronously with the vertical synchronizing signal HD.

Furthermore, the three tube type projector shown in FIG. 5 includes a signal oscillator circuit 27 for oscillating horizontal and vertical synchronizing sawtooth wave and parabolic wave signals, a horizontal sub-deflection circuit 28H for supplying a current for convergence correction to a coil of each of horizontal sub-deflection yokes of cathoderay tubes 1R, 1G and 1B, and a vertical sub-deflection circuit 28V for supplying a current for convergence correction to a coil of each of vertical sub-deflection yokes thereof.

The signal oscillator circuit 27 is supplied with horizontal and vertical synchronizing signals HD and VD separated by the synchronizing separator circuit 25, and then, horizontal and vertical period sawtooth and parabolic wave signals are produced synchronously with these synchronizing signals HD and VD.

The horizontal sub-deflection circuit 28H is supplied with horizontal and vertical period sawtooth and parabolic wave signals formed by the signal oscillator circuit 27. Subsequently, the horizontal sub-deflection circuit 28H is operated so as to produce a horizontal convergence correction signal corresponding to each of cathode-ray tubes 1R, 1G and 1B by taking advantage of these supplied signals, and to supply a current corresponding to the horizontal convergence correction signal to a coil constituting each of horizontal sub-deflection yokes of cathode-ray tubes 1R, 1G and 1B.

The vertical sub-deflection circuit 28V is supplied with horizontal and vertical period sawtooth and parabolic wave signals produced by the signal oscillator circuit 27. Subsequently, the vertical sub-deflection circuit 28V is operated so as to produce a vertical convergence correction signal corresponding to each of cathode-ray tubes 1R, 1G and 1B by taking advantage of these supplied signals, and to supply a current corresponding to the vertical convergence correction signal to a coil constituting each of vertical sub-deflection yokes of cathode-ray tubes 1R, 1G and 1B.

According to the constitution as described above, when the input terminal 20 is supplied with the video signal SV, red, green and blue color signals R, G and B corresponding to the video signal are outputted from the matrix circuit 23, and thereafter, individually amplified by video output circuits 24R, 24G and 24B, and supplied to a cathode K of respective cathode-ray tubes 1R, 1G and 1B. Thus, an electron density of electron beam outputted from the cathodes K of respective cathode-ray tubes 1R, 1G and 1B are individually modulated by color signals R, G and B.

Also, when the horizontal deflection current which synchronizes with the horizontal synchronizing signal HD separated from the video signal SV by the horizontal deflection circuit 26H, is supplied to horizontal deflection coils constituting deflection yokes 4R, 4G and 4B, horizontal deflection scanning of electron beam is carried out. Simultaneously, when the vertical deflection current, which synchronizes with the vertical synchronizing signal HD separated from the video signal SV by the horizontal deflection circuit 26V, is supplied to vertical deflection coils constituting deflection yokes 4R, 4G and 4B, vertical deflection scanning of electron beam is carried out. Whereby red, green and blue pictorial images corresponding to color signals R, G and B are displayed on a fluorescent screen of respective cathode-ray tubes 1R, 1G and 1B. Although there is no illustration, respective color images on respective cathode-ray tubes 1R, 1G and 1B are projected on a screen through projection lenses, thus a color image enlarged on the screen can be obtained (see FIG. 1).

Horizontal convergence correction signals corresponding to respective cathode-ray tubes 1R, 1G and 1B are produced by taking advantage of a sawtooth wave signal and a parabolic wave signal which synchronizes with synchronizing signals HD and VD separated from the video signal by the horizontal sub-deflection circuit 28H, and a current corresponding to the horizontal convergence correction signal is supplied to each of coils constituting horizontal sub-deflection yokes of cathode-ray tubes 1R, 1G and 1B. Moreover, vertical convergence correction signals corresponding to respective cathode-ray tubes 1R, 1G and 1B are produced by taking advantage of a sawtooth wave signal and a parabolic wave signal which synchronizes with synchronizing signals HD and VD separated from the video signal by the vertical sub-deflection circuit 28V, and a current corresponding to the vertical convergence correction signal is supplied to each of coils constituting vertical sub-deflection yokes of cathode-ray tubes 1R, 1G and 1B. Whereby convergence correction is carried out so that red, green and blue color images are converged on the screen.

Figure 7A:
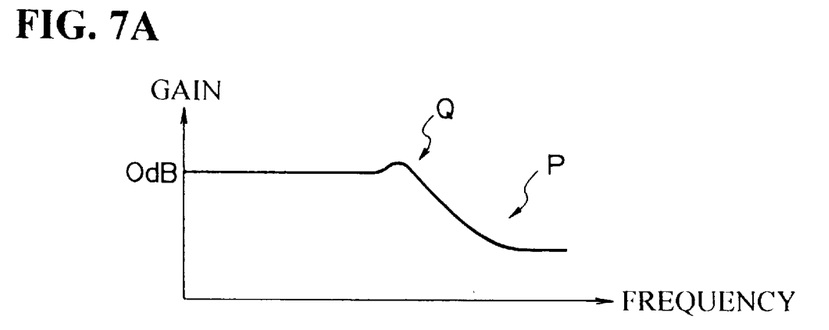
FIGS. 7A, 7B, 7C, and 7D are plots of gain vs. frequency useful for explaining a correction frequency characteristic of the convergence correction circuit according to an embodiment of the present invention.

The present applicant has found a correction frequency characteristic as shown in FIG. 7A. Specifically, in the foregoing conventional convergence correction circuit as shown in FIG. 3, the correction frequency characteristic is obtained by supplying a DC signal and a sine wave signal having an amplitude equal to the DC signal and a frequency successively increased, to the input terminal 11 in place of a convergence correction signal Scp, and by measuring a beam position on the cathode-ray tube. As seen from FIG. 7A, a gain increases at a predetermined part Q of frequency, and decreases at a high frequency part P. As seen from the above description, the correction frequency characteristic is not flat. This is the reason why the motion of image on a fluorescent screen of cathode-ray tube does not coincide with a wave form of the correction signal Scp.

The present applicant has found the following matters. Specifically, an increase of gain at a predetermined part Q of frequency is resonance characteristic due to an influence of coupling of the sub-deflection yoke with the deflection yoke. On the other hand, a decrease of gain at a high frequency part P is characteristic due to an influence of an eddy current caused in an electrostatic convergence electrode by a magnetic field generated by the sub-deflection yoke.

Figure 6:
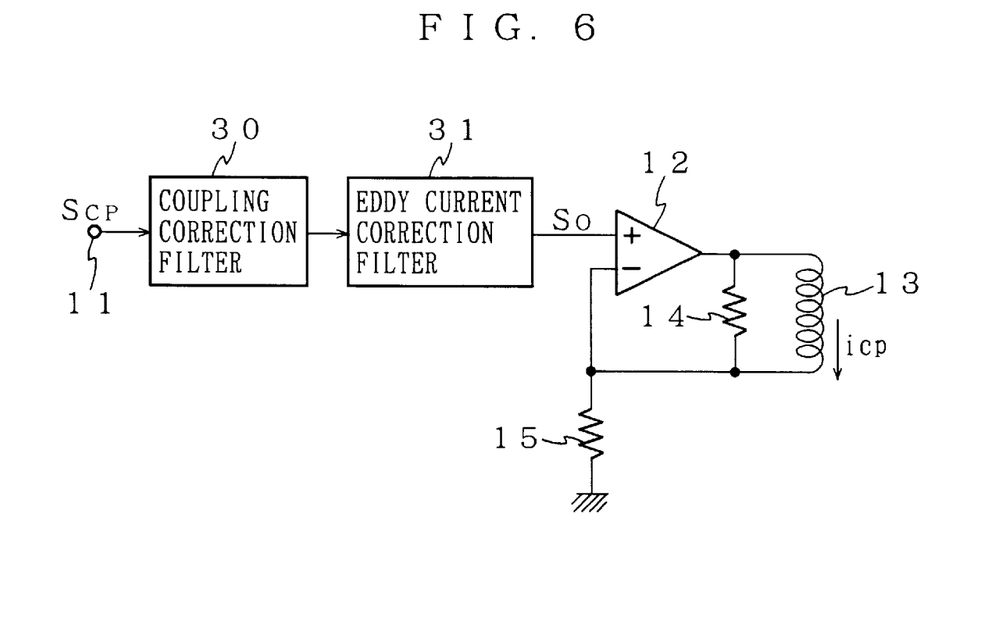
FIG. 6 is a view showing a configuration of a convergence correction circuit according to an embodiment of the present invention.

According to the present embodiment, the horizontal sub-deflection circuit 28H or the vertical sub-deflection circuit 28V is provided with a convergence correction circuit (sub-deflection output circuit) for supplying a current corresponding to a convergence correction signal to a coil of horizontal and vertical sub-deflection yokes of cathode-ray tubes 1R, 1G and 1B. The convergence correction circuit is constructed as shown in FIG. 6. In FIG. 6, like reference numerals are used to designate parts corresponding to those shown in FIG. 3.

In FIG. 6, the input terminal 11 which is supplied with a convergence correction signal Scp is connected to a noninverting input terminal of the Operational amplifier 12 through a coupling correction filter 30 and an eddy current correction filter 31 which are connected in series. The coupling correction filter 30 and the eddy current correction filter 31 may be arranged conversely to the arrangement shown in FIG. 6. Moreover, an output terminal of the operational amplifier 12 is connected to an inverting input terminal of the operational amplifier 12 through a coil 13 constituting a sub-deflection yoke and a resistor 14 which are connected in parallel. An inverting input terminal of the operational amplifier 12 is grounded through a resistor 15.

Figure 7B:
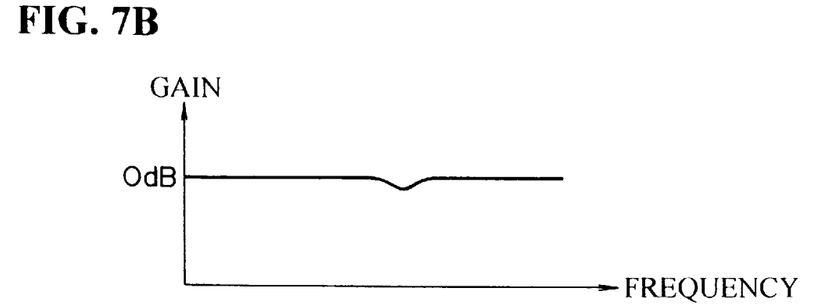
Figure 7C:
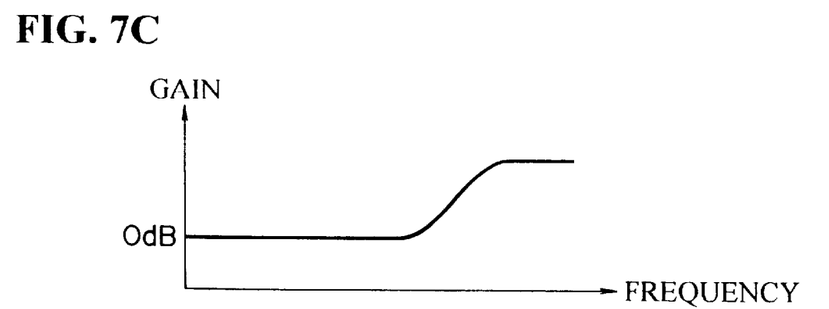

The coupling correction filter 30 corrects a change in correction frequency characteristic due to an influence of coupling of a sub-deflection yoke and a deflection yoke. Moreover, as shown in FIG. 7B, the coupling correction filter 30 is constructed so as to have frequency characteristic capable of offsetting an increase of gain at a predetermined part Q of frequency in correction frequency characteristic shown in FIG. 7A. On the other hand, the eddy current correction filter 31 corrects a change in correction frequency characteristic due to an influence of an eddy current caused in an electrostatic focusing electrode by a magnetic field generated in the sub-deflection yoke. Moreover, as shown in FIG. 7C, the eddy current correction filter 31 is constructed so as to have frequency characteristic capable of offsetting a decrease of gain at a high frequency part P in correction frequency characteristic shown in FIG. 7A.

In the convergence correction circuit constructed as described above, when a convergence correction signal Scp is supplied to the input terminal 11, the coil 13 constituting the sub-deflection yoke is supplied with a current icp proportional to an output signal So from a series circuit composed of the coupling correction filter 30 and the eddy current correction filter 31, thus convergence correction is carried out.

Figure 7D:
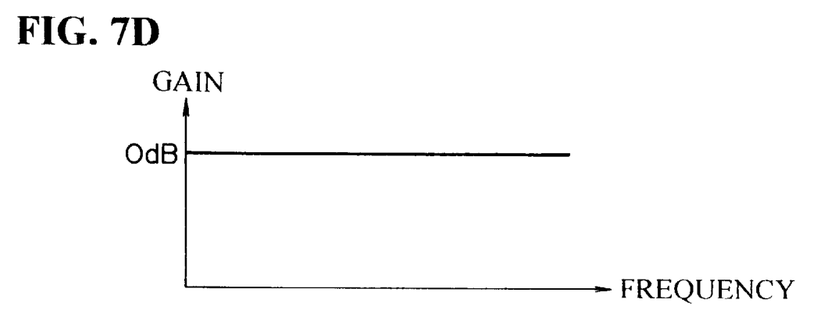

In the convergence correction circuit shown in FIG. 6, there is obtained a correction frequency characteristic which is flat as shown in FIG. 7D by supplying a DC current and a sine wave signal having in amplitude equal to the DC current and a frequency successively increased and by measuring beam position on a fluorescent screen of the cathode-ray tube. Thus, the convergence correction circuit shown in FIG. 6 has correction frequency characteristic which is flat, so that the motion of image on a fluorescent screen of the cathode-ray tube coincides with a wave form of the correction signal Scp. Therefore, high-precise convergence correction can be performed.

Figure 8A:
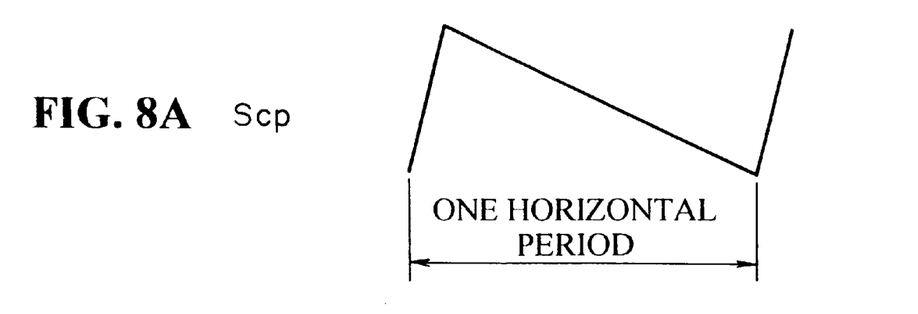
FIGS. 8A, 8B, 8C, and 8D show a relationship between a wave form of a correction signal and motion of an image on a fluorescent screen of a cathode-ray tube according to an embodiment of the present invention.
Figure 8B:
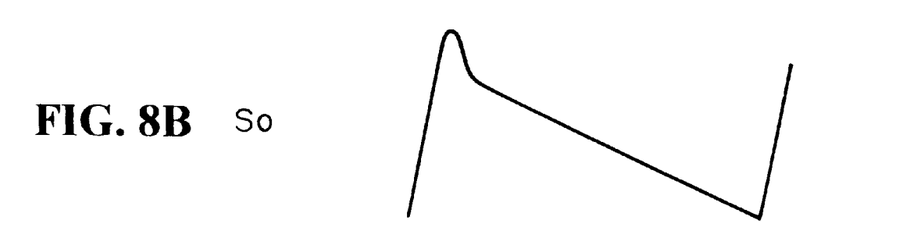
Figure 8C:
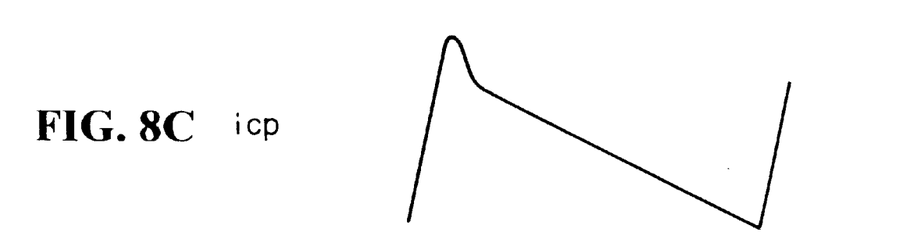
Figure 8D:
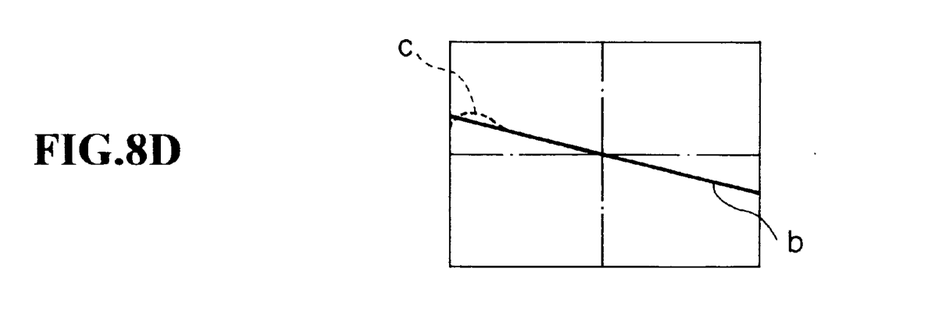

For instance, in the convergence correction circuit for the vertical sub-deflection yoke, when a correction signal Scp as shown in FIG. 8A is supplied to the input terminal 11, an output signal So from the series circuit composed of the coupling correction filter 30 and the eddy current correction filter 31 becomes as shown in FIG. 8B, and the coil 13 constituting the sub-deflection yoke is supplied with a current icp proportional to the output signal So, as shown in FIG. 8C. Whereby the motion of image on a fluorescent screen of the cathode-ray tube becomes as shown by a solid line "b" in FIG. 8D; therefore, the motion of image coincides with a wave form of the correction signal Scp. A broken line "c" in FIG. 8D shows the motion of image on a fluorescent screen of the cathode-ray tube in the case where the foregoing correction filters 30 and 31 are not provided in a convergence correction circuit (the broken line "c" is the same as the solid line "a" of FIG. 4B).

Also, the convergence correction circuit shown in FIG. 6 is provided with the foregoing correction filters 30 and 31, so that there can be obtained correction frequency characteristic which is flat. Thus, even if cathode-ray tubes 1R, 1G and 1B are a multi-scan type and a horizontal deflection frequency changes, a deviation in convergence does not theoretically occur, so that convergence correction can be readily performed.

In the above embodiment, cathode-ray tubes 1R, 1G and 1B, which are electrostatic focusing type, have been employed, and the coupling correction filter 30 and the eddy current correction filter 31 are interposed between a path of a convergence correction signal Scp of the convergence correction circuit, as shown in FIG. 6. In the case where cathode-ray tubes 1R, 1G and 1B, which are of the electromagnetic focusing type are employed, there is no need of considering a change in correction frequency characteristic due to an influence of an eddy current caused in an electrostatic focusing electrode by a magnetic field generated by a sub-deflection yoke. Therefore, the eddy current correction filter 31 is not required. Specifically, a projection cathode-ray tube having no electrostatic focusing electrode does not require the eddy current correction filter.

Figure 9:
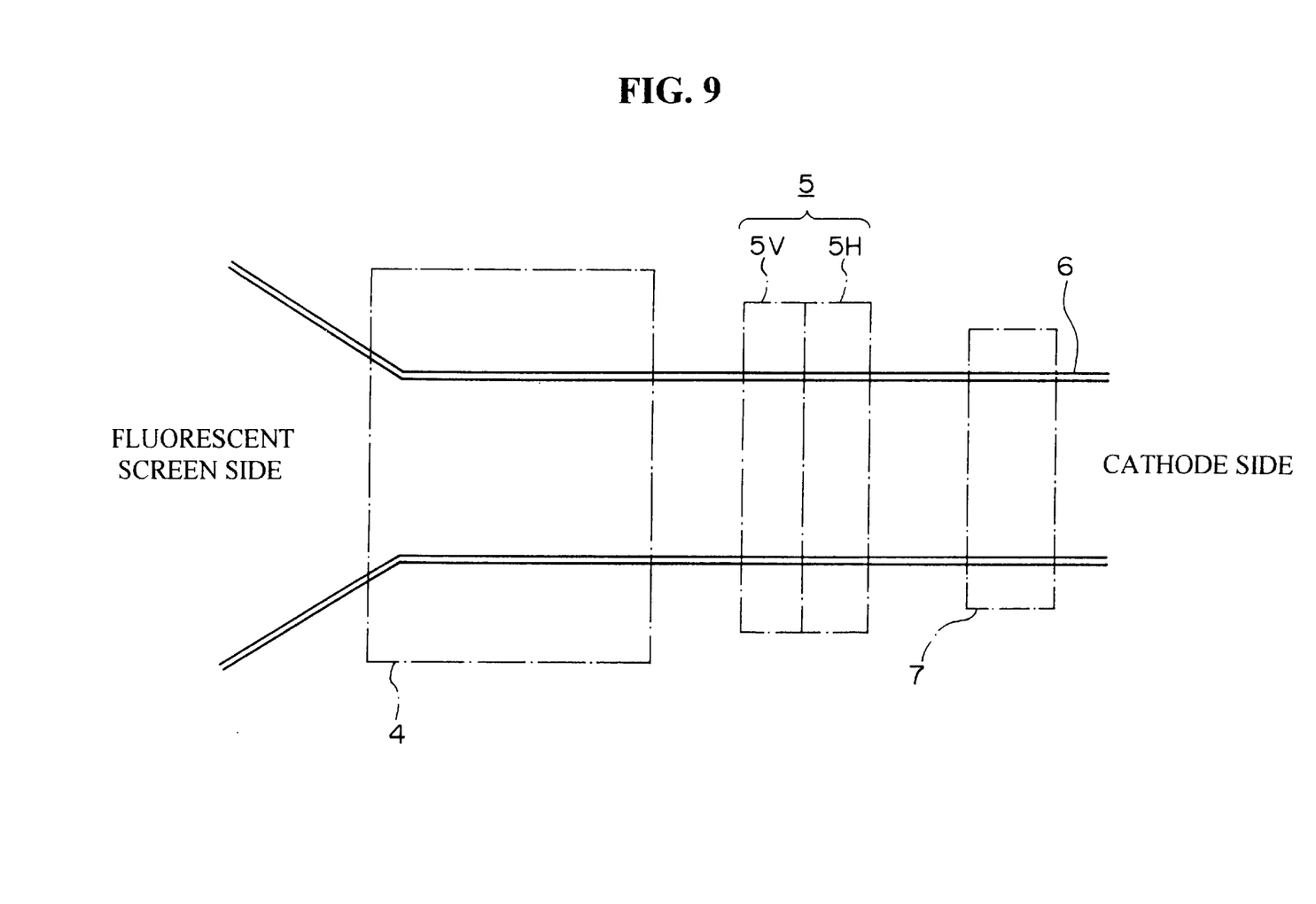
FIG. 9 is a view showing an arrangement relationship between a deflection yoke, a sub-deflection yoke and an electromagnetic lens in an electromagnetic focusing cathoderay tube.

FIG. 9 shows an arrangement relationship between a main deflection yoke, a sub-deflection yoke and an electromagnet constituting an electromagnetic lens in an electromagnetic focusing cathode-ray tube (CRT). A sub-deflection yoke 5 (horizontal sub-deflection yoke 5H, vertical sub-deflection yoke 5V) is arranged in a neck portion 6 of the cathode-ray tube, and situated on a cathode side thereof closer than a main deflection yoke 4. Moreover, an electromagnet (electromagnetic lens) 7 is arranged in the neck portion 6 of the cathode-ray tube, and situated on a cathode side closer than the subdeflection yoke 5.

In the above embodiment, the convergence correction circuit shown in FIG. 6 is constructed so that the coupling correction filter 30 and the eddy current correction filter 31 are arranged separately from each other. These correction filters 30 and 31 may be constructed integrally with each other.

As described above, according to the present invention, the coupling correction filter for correcting a change in correction frequency characteristic due to an influence of coupling of a sub-deflection yoke with a deflection yoke is interposed between a path of a correction signal supplied to a sub-deflection yoke for convergence correction. Thus, a deviation between a motion of an image on a fluorescent screen of the cathode-ray tube coincides and a wave form of a correction signal is offset in convergence correction, so that high-precise convergence correction can be provided. Moreover, even if cathode-ray tubes 1R, 1G and 1B are a multi-scan type and a horizontal deflection frequency changes, a deviation in convergence does not theoretically occur, so that convergence correction can be readily performed.

In the case where the projection cathode-ray tube has an electrostatic focusing electrode, the eddy current correction filter 31 for correcting a change in correction frequency characteristic due to an influence of an eddy current caused in an electrostatic focusing electrode by a magnetic field generated in the sub-deflection yoke, is connected in series with the coupling correction filter, thereby the foregoing effect being further improved.

It will be obvious to those having skill in the art that many changes may be made in the above-described details of the preferred embodiment of the present invention. The scope of the present invention, therefore, should be determined according to the following claims.

What is claimed is:

1. A convergence correction circuit which corrects convergence by supplying a correction signal to a sub-deflection yoke for convergence correction arranged in a neck portion of a projection cathode-ray tube, wherein said projection cathode ray-tube includes a separate deflection yoke, said convergence correction circuit comprises:

a coupling correction filter for correcting a change in a correction frequency characteristic due to an influence of coupling of said sub-deflection yoke with said deflection yoke, wherein said coupling correction filter is installed in a path of said correction signal, wherein said projection cathode-ray tube includes an electrostatic focusing electrode, wherein said convergence correction circuit includes an eddy current correction filter for correcting a change in a correction frequency characteristic due to an eddy current produced in said electrostatic focusing electrode by a magnetic field generated by said sub-deflection yoke, and wherein said eddy current correction filter is connected in series with said coupling correction filter, thereby obtaining a flat corrected frequency characteristic.

2. A three tube type projector including respective projection cathode-ray tubes for red, green and blue color images, wherein convergence is corrected by supplying a correction signal to a sub-deflection yoke for convergence correction arranged in a neck portion of said respective projection cathode-ray tubes, and wherein each of said respective projection cathode-ray tubes includes a separate deflection yoke, said three tube type projector comprises:

a convergence correction circuit including a coupling correction filter for correcting a change in a correction frequency characteristic due to an influence of coupling of said sub-deflection yoke with said deflection yoke, wherein said coupling correction filter is installed in the path of said correction signal, wherein each of said respective projection cathode-ray tubes includes an electrostatic focusing electrode, wherein said convergence correction circuit further includes an eddy current correction filter for correcting a change in a correction frequency characteristic due to an eddy current produced in said electrostatic focusing electrode by a magnetic field generated by said sub-deflection yoke, and wherein said eddy current correction filter is connected in series with said coupling correction filter, thereby obtaining a flat correct ed frequency characteristic.

* * * * *